Feb. 24, 1959  C. H. BENNETT  2,874,457
METHOD OF REMOVING DIESEL ENGINE INJECTOR TUBES
Filed March 26, 1954  2 Sheets-Sheet 2
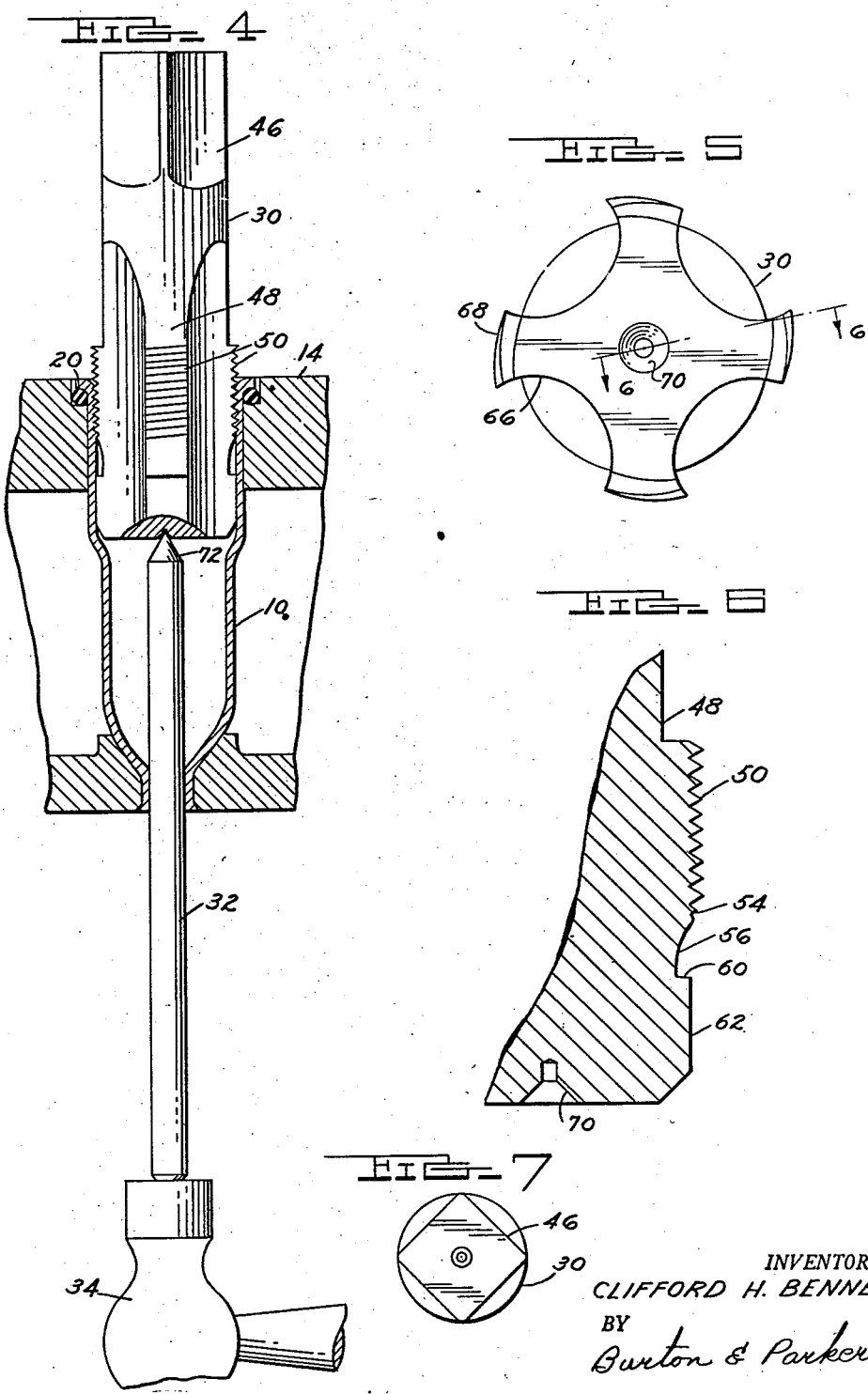
INVENTOR.
CLIFFORD H. BENNETT
BY
Burton & Parker
ATTORNEYS

United States Patent Office 2,874,457
Patented Feb. 24, 1959

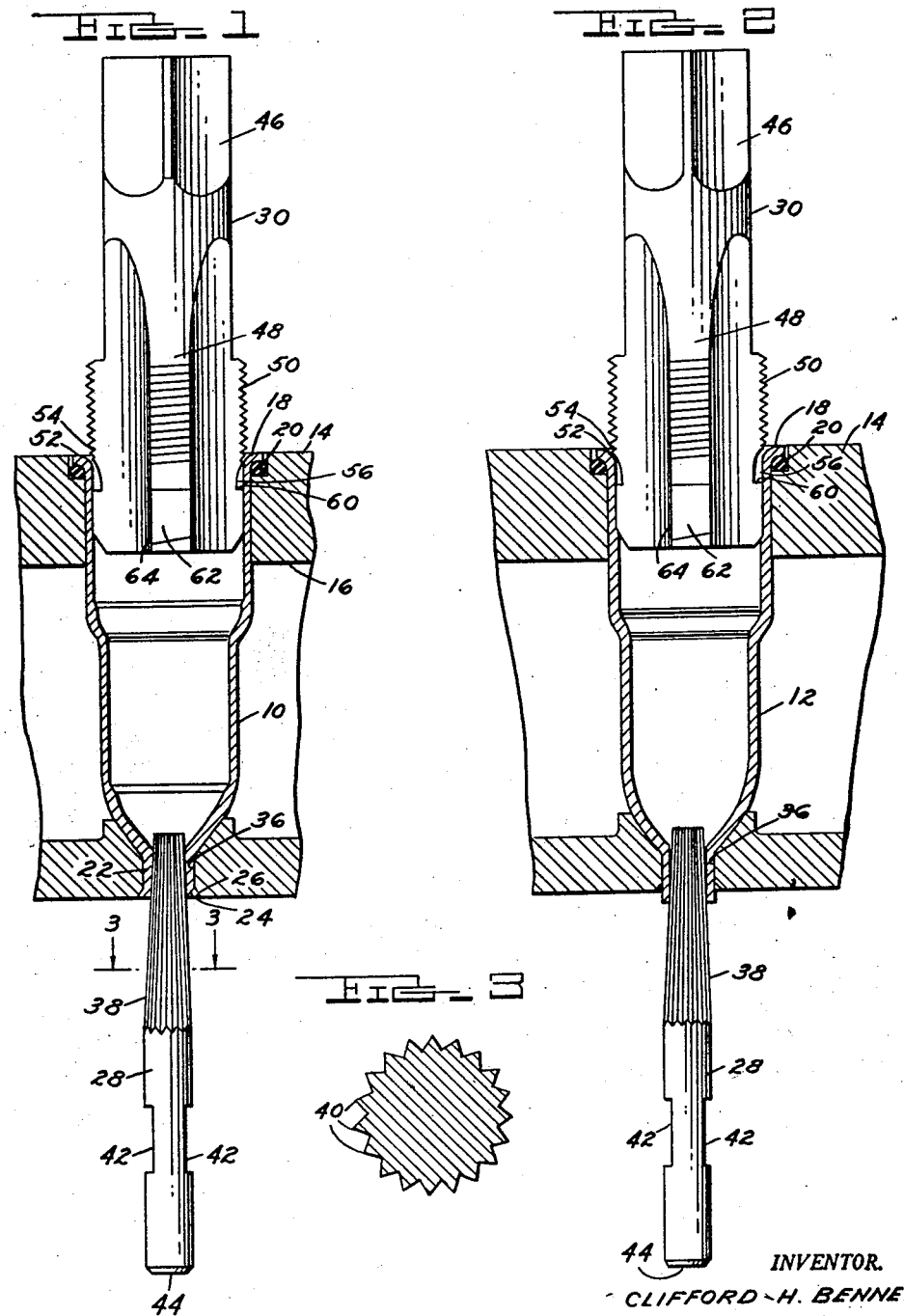

2,874,457
METHOD OF REMOVING DIESEL ENGINE INJECTOR TUBES

Clifford H. Bennett, Jackson, Mich., assignor to Kent-Moore Organization, Inc., Detroit, Mich., a corporation of Michigan Application March 26, 1954, Serial No. 419,056

4 Claims. (Cl. 29—427)

This invention relates to a process of and apparatus for removing a diesel engine injector tube from the cylinder head of an engine.

In many of the modern diesel engines of today, the fuel is injected into the combustion chamber by means of a fuel injector device which is mounted in the cylinder head of the engine. An injector nozzle, part of the injector device, opens into the combustion chamber through a port in the cylinder head. Because the injector frequently extends across or through a water cooling passageway in the cylinder head, it is necessary to seal the water in the passageway from contact with the injector and also prevent leakage of the water from the passageway down along the injector and into the combustion chamber of the engine. To prevent such leakage of water into the combustion chamber around the injector, where the injector enters the combustion chamber, and also to prevent direct contact of the water with the injector, the injector is encased in what may be termed an injector tube.

The tube is made of copper or some other malleable metal. It frequently becomes worn or damaged, or loosens up from its seat in the cylinder head, permitting water to leak into the combustion chamber of the engine. In this event the tube must be replaced. Scale frequently builds up on the walls of the tube because of the hardness of the water being pumped through the engine. This scale prevents the tube from being readily removed from the cylinder head through the use of conventional methods and tools.

The tube is provided with a flange at its upper end, which flange seats against a sealing ring disposed on the outside surface of the cylinder head. The tube extends through the cylinder head, extending across the water or coolant passageway in the head, and the lower end, or tip of the tube, extends through the combustion chamber surface of the head. The tube tip is flared over against the combustion chamber surface of the head to seal the tube tip against the head and prevent the escape of coolant from the passageway into the combustion chamber of the engine.

The tube may be removed from the cylinder head either by cutting away completely the flared-over portion of the tube tip and then forcing the tube upwardly out of the cylinder head, or the tube may be driven upwardly out of the head without cutting away the flared-over tip, relying on the malleability of the material of which the tube is made to permit the flared-over portion to give way during the upward driving of the tube. The second method is preferable provided the tube is engaged by some means against which a mechanic can drive to force the tube out of the head. In carrying out this preferred method it is necessary to hold the tube stationary in the cylinder head so that the means against which the mechanic drives in removing the tube, may be threaded into the tube.

An object of my invention is the provision of a process for removing an injector tube installed in a cylinder head as aforesaid, which includes the holding of the tube to prevent rotation thereof in the head, threading engaging means into the tube from the upper end to engage the tube, releasing the hold on the tube so that it may move in the head, and then driving against the engaging means to force the engaging means and the tube upwardly out of the head.

Another object of my invention is the provision of three tools, cooperable to remove an injector tube from the cylinder head of a diesel engine, wherein one tool is slightly tapered and adapted to be driven into the injector tube tip to prevent rotation of the tube in the cylinder head, and a second tool is adapted to be threadedly received in the opposite end of the tube while the tube is held against rotation by the first tool, and a third tool is adapted to be inserted into the tube after the first tool is removed, and thereafter the third tool driven against the second tool to force the second tool and the tube out of the head.

Another object of my invention is the provision of an injector tube holder adapted to be inserted into the tip of an injector tube and driven thereinto to hold the tube against rotation in the cylinder head. The holder is tapered slightly from one end toward the opposite end, and the sides of the holder are provided with lands extending longitudinally of the holder over the tapered surface thereof, which lands force the wall of the tube tip outwardly against the cylinder head to squeeze the tube against the head when the holder is driven into the tube.

Still another object of the invention is the provision of a tube-pulling tap exhibiting threaded flutes adapted to be engaged with the interior surface of the wall of the tube so that upon forcing of the tap outwardly of the cylinder head the tube will be withdrawn with the tap. A concomitant object is the provision of a tap of this character provided with a pilot portion receivable within the tube ahead of the threaded flutes, and which pilot ensures proper axial alignment of the tap with the tube.

A meritorious feature of the invention is the provision of a tap of the aforementioned character wherein the pilot portion is shaped to provide a plurality of reaming teeth adapted to cut away the walls of an injector tube so that the tap will properly thread into the tube.

Other objects, advantages, and meritorious features will become more fully apparent from the following specification, claims, and drawings, wherein:

Fig. 1 is a cross-sectional view of a cylinder head showing an installed injector tube with my pulling tap and tube holder inserted in the tube;

Fig. 2 is similar to Fig. 1, but the injector tube shown is a new injector tube which, for some reason, has not seated properly in the cylinder head and it is desired to remove it and replace the same with another tube;

Fig. 3 is a cross-sectional view of my tube holder taken on line 3—3 of Fig. 1;

Fig. 4 is similar to Fig. 1 but shows the pulling tap completely inserted into the injector tube, and with the tube holder removed and the driving tool inserted in the tube;

Fig. 5 is an end view of the tap looking at the pilot end face thereof;

Fig. 6 is a cross-sectional view taken on line 6—6 of Fig. 5; and

Fig. 7 is an end view showing that end of the tap adapted to be engaged by a tap-driving chuck.

Shown in Figs. 1, 2 and 4 are injector tubes 10 and 12 mounted in a cylinder head 14 of a diesel engine. The tubes extend across or through a coolant passageway 16 in the head, with the upper end of the tube rolled over as at 18 to seat against a sealing ring 20 disposed between the rolled-over portion of the tube and the cylinder head. The lower end of the tube is provided with a tube tip 22 which is flared over as at 24 in Figs. 1 and 4 to seat against a bevel 26 formed at the mouth of the aperture in the cylinder head, through which the tube tip extends. In Fig. 2 the injector tube shown is one which has just been installed in the head but which, for some reason, is defectively installed and it is desired to remove such tube from the cylinder head. The tube tip has not been flared over.

To remove the injector tube shown in Figs. 1, 2 and 4 from the cylinder head a tube-holder 28 is driven into the injector tube to grip the tube tip between the holder and the cylinder head, thereby preventing rotation of the tube within the cylinder head. A tube-pulling tap 30 is then threaded into the other end of the tube until it reaches the position shown in Fig. 4. Thereupon the holder 28 is removed from the tube tip and a driving rod 32 is inserted into the tube through the tube tip and the nose of the rod is brought up against the end face of the tap. By means of a hammer 34 the rod is driven against the tap and the tap thereby forced out of the cylinder head, drawing with it the injector tube. The injector tubes are formed of copper or some other malleable metal, and therefore, as the tap is driven out of the head, the flared-over portion 24 of the tube tip is deformed so that it will pass through the opening 36 in the cylinder head through which the tube tip extends.

The holder or wedge 28 is shaped as shown in Figs. 1 and 2 and is provided with a slender tapering body portion 38 which tapered portion is shaped to exhibit a plurality of longitudinally extending lands, flutes or teeth 40, shown in cross section in Fig. 3. Each land is provided with a sharp arris as shown in Fig. 3 so that the land will cut or dig into the metal of the tube tip as the holder is driven thereinto. As the holder is driven into the tube tip, the wall of the tip throughout the longitudinal dimension thereof is forced outwardly against the wall of the aperture 36 in the cylinder head. Those portions of the tube tip that are forced against the cylinder head complement the shape of the holder. In other words the wall of the tube tip is deformed to exhibit serrations which are urged against the cylinder head and prevent the rotation of the tube in the head.

The taper of the holder is such that the wall of the tube tip from the lower end of the tip to the opposite end adjacent the body of the tube, is engaged by the teeth of the holder, in the manner shown in Fig. 1. Because the teeth 40 of the holder are equilaterally shaped in cross section as shown in Fig. 3, the teeth dig into the wall of the tip and are embedded therein. When torque is applied to the tube, and the holder is held against the torque applied to the tube, the sides of the teeth 40 will prevent rotation of the tube relative to holder.

Rearwardly of the tapered body portion 38, the tube holder is provided with a flatted portion whose opposite faces are indicated as 42. Such flatted portion is adapted to be gripped by a wrench to further aid in the prevention of rotation of the tube. As the arrises of flutes 40 bite into the metal of the tube tip, the holder is anchored in the tube tip. Each flute so embedded in the metal of the tube tip prevents relative rotation between the holder and the tube. Therefore, when the holder, or wedge, is driven into the tube tip and a wrench is applied to the flatted portion to prevent rotation of the holder, rotation of the tube is also prevented. In many cases it is not necessary to engage the holder with a wrench because the gripping of the tube tip between the holder and the cylinder head as aforesaid, will effectively prevent rotation of the tube as the tap is threaded into it. But if rotation of the tube in the cylinder head should occur, then a wrench may be applied to the holder and rotation of the tube prevented in this manner. The lower end of the holder is shaped as shown at 44 to provide a driving face against which the driving tool is operated in forcing the holder into the tube.

The tube-pulling tap 30 is squared as at 46 at its upper end to provide a surface which may be gripped by a tap-driving chuck in order to thread the tap into the tube. Below the chuck-engaging end of the tap, the tap exhibits four flutes 48. Each flute is shaped along the surface of its radial extremity to exhibit cutting teeth 50. At least two of the teeth 52 and 54 are of smaller diameter than the remaining teeth, and act as a lead to facilitate starting the tap in the tube. Immediately below the teeth the flutes are cut away as at 56. Such cut-away portions 56 terminate in radially extending shoulders 60. The shoulders form the upper edge of four pilot flutes 62. Such pilot flutes are sharpened along their leading edge as at 64. The pilot flutes are in reality simply extensions of the flutes 48, but the pilot flutes are not provided with the teeth 50, but rather the surface of the radial extremity of the flutes 62 is smooth.

As shown in Fig. 5 the flutes 48 and 62 are slightly hooked as at 66 to improve the cutting edge of the flutes 62 and the cutting edge of the teeth 50 of the flutes 48. The trailing edge of the flutes 48 is relieved as at 68 to reduce the amount of force required to turn the tap into the tube. To effect such relief of the flutes 48, the trailing edge of the cutting teeth is shaved away as shown at 68 in Fig. 5.

The lower end face of the tap is recessed as at 70 to provide a tap-driving rod guide. The tap-driving rod 32 is provided with a nose portion 72 as shown in Fig. 4, which is adapted to fit within the complementary recess 70 in the tap. With the provision of the recess 70, when the nose of the tap is seated within the recess, there is no danger of the nose of the rod skidding across the end face of the tap and becoming wedged between the flutes of the tap and the wall of the tube during the driving of the tap out of the head.

After the holder has been driven into the tube tip and the tube is held stationary in the head, the tap is threaded into the tube until it reaches the position shown in Fig. 4. Thereafter the holder is removed from the tube tip by tapping it perpendicular to its axis. After the holder has been removed the driving rod 32 is inserted into the tube through the tip and the nose of the rod is seated in the guide recess 70. A hammer such as 34 is then used by the mechanic to drive the rod upwardly against the tap and thereby force the tap out of the cylinder head drawing with it the tube.

The tube shown in Fig. 2, as mentioned hereinabove, has, for some reason, been found unsuited for continued installation operations, such as flaring over the tube tip and reaming out the tube to receive the injector device. It is therefore desirable to remove the tube. The tubes shown in Figs. 1 and 4 were reamed out during their installation to receive the injector device so that the inside diameter of the tubes in Figs. 1 and 4 is somewhat greater than the inside diameter of the tube 12 in Fig. 2. Such difference in the inside diameter of the tubes will prevent the tap from being received within tube 12 which has not been previously reamed. For this reason the pilot flutes 52 are sharpened along their leading edges to ream away the wall of the tube so that it approaches an inside diameter equivalent to the inside diameter of the tubes shown in Figs. 1 and 4. In Fig. 2 it will be noted that the inside diameter of the tube below the end of the tap is somewhat less than the inside diameter above the tap. The sharpened leading edges of the flutes 62 have cut away the inside of the tube upon the rotation of the tap. Such cutting away or reaming of the inside of the tube permits the lead threads 52 and 54 of the tap to bite into and begin threading into the tube.

Besides furnishing a means for reaming out the inside of a new tube which is defectively installed, the pilot portion also serves to guide and axially align the tap with the axis of the tube. The walls of the tube are relatively thin and therefore it is necessary to provide some means for carefully guiding the tap thereinto, otherwise the threads of the tap are apt to cut into the cylinder head. The diameter of the threads is such that they will cut through substantially one-half of the thickness of the wall of the tube.

What I claim is:

1. That process of removing an injector tube from the cylinder head of an engine, comprising: inserting a tube-gripping member into the tube tip and gripping the tube between the member and the cylinder head holding the tube-gripping member against rotation and concurrently threading a tap into the opposite end of the tube, releasing the gripping action of the gripping member, and thereafter urging the tap out of the head drawing the tube with it.

2. That process of removing an injector tube from the cylinder head of an engine, comprising: driving a wedge-like member into the injector tube tip to grippingly engage the member with the tube tip to prevent relative rotation between the member and the injector tube, holding the wedge-like member against rotation and concurrently threading a tap member into the opposite end of the tube, removing the wedge-like member from the tube tip, and driving through the tube tip against the tap to force the tap and the tube out of the head.

3. That process of removing an injector tube from the cylinder head of an engine comprising: driving a longitudinally fluted wedge into the injector tube tip to force the flutes into the metal of the tube tip and anchor the wedge in the tube tip, holding the wedge to prevent rotation thereof, threading a tap member into the opposite end of the tube, removing the wedge from the tube tip, and driving through the tube tip against the tap to force the tap and the tube out of the cylinder head.

4. That process of removing an injector tube from the cylinder head of an engine comprising: driving a wedge into the injector tube tip to jam the wall of the tip against the cylinder head and prevent rotation of the tip, threading a tap member into the opposite end of the tube, removing the wedge from the tube tip, inserting a tap-driving rod through the tube tip and bringing the nose of the rod into engagement with the end face of the tap within the tube, and thereafter driving against the rod to force the tap out of the cylinder head drawing the tube with it.

References Cited in the file of this patent

UNITED STATES PATENTS

| | | |
|---|---|---|
| 678,814 | Riggs | July 16, 1901 |
| 1,133,014 | Faessler | Mar. 23, 1915 |
| 1,286,897 | Albertson | Dec. 10, 1918 |
| 1,304,109 | Simon | May 20, 1919 |
| 1,382,835 | Johnson | June 28, 1922 |
| 1,478,414 | Wells | Dec. 25, 1923 |
| 1,688,460 | Fowler | Oct. 23, 1928 |
| 2,306,760 | Shaw | Dec. 29, 1942 |
| 2,330,242 | Romero | Sept. 28, 1943 |
| 2,559,210 | Bradley | July 3, 1951 |
| 2,731,714 | Dudley | Jan. 24, 1956 |